Dec. 29, 1959 C. H. BROOKS 2,919,265
POLYMERIZATION PROCESS
Filed May 29, 1957
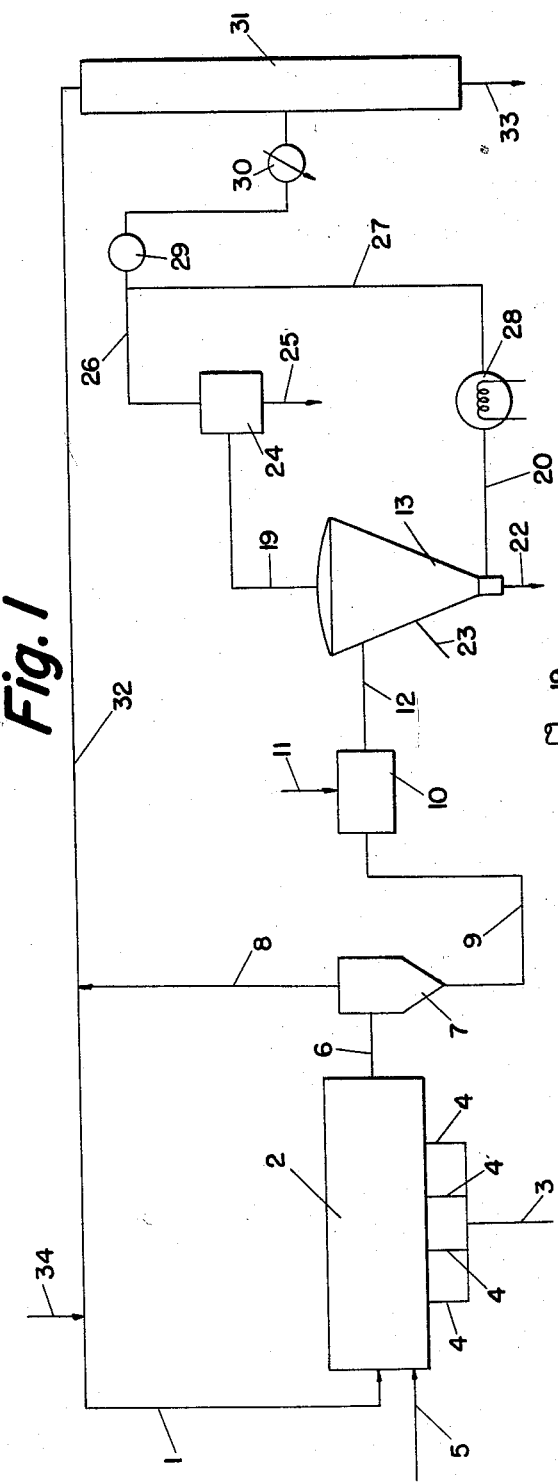
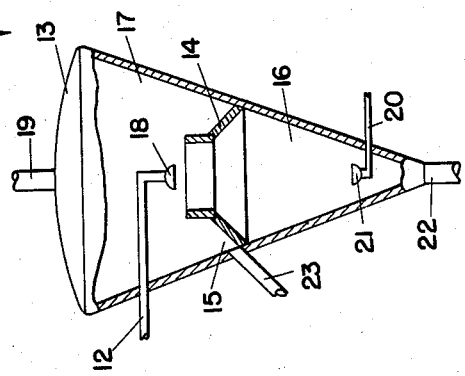
INVENTOR.
CHARLES H. BROOKS
BY Robert D. Spundle
ATTORNEY

2,919,265

POLYMERIZATION PROCESS

Charles H. Brooks, Swarthmore, Pa., assignor to Sun Oil Company, Philadelphia, Pa., a corporation of New Jersey Application May 29, 1957, Serial No. 662,409

4 Claims. (Cl. 260—93.7)

This invention relates to the polymerization of olefins, and more particularly to a process for the polymerization of ethylene, propylene and butene-1 in the presence of a metal alkyl activated metal halide catalyst.

It is known that solid, high density polymers of ethylene, propylene and butene-1 may be formed by contacting a solution of the olefin in an inert solvent with a finely divided catalyst prepared by activating a metal halide catalyst with a metal alkyl. Suitable catalysts for the reaction include complexes formed by the reaction of a halide of a metal of groups IV, V and VI with an activator which acts as a strong reducing agent, such as alkyl derivatives of aluminum, zinc, beryllium, chromium, magnesium, sodium, potassium and lithium. Aluminum triethyl, aluminum triisopropyl, aluminum triisobutyl and the magnesium and zinc analogues are preferred, but metal alkyls containing up to about 12 carbon atoms in the alkyl groups can be used with good results. While the metal halide activated by the activator is preferably titanium trichloride, halides of zirconium, hafnium, vanadium, niobium, chromium, molybdenum, or tungsten may be used. The complex is prepared by slurrying the metal halide and the activator in an inert medium in a mol ratio of from about 1:10 to 10:1, although ratios of from 1:4 to 3:4 are preferred. When in the specification and claims the term "Ziegler catalyst" is used, I am referring to catalysts of the above type only. The catalyst complex should be present in the reaction mixture in an amount of from about 0.001% to about 0.25% by weight, preferably about 0.1%.

The polymerization is preferably conducted at temperatures of from 140° F. to 190° F., although temperatures as high as 250° F. may be used, in the presence of an inert solvent for the olefin which is to be polymerized, and at pressures sufficient to hold the reaction mixture in liquid phase. Commonly used solvents include isooctane or n-heptane. In accordance with the present invention, however, the preferred solvent is a saturated hydrocarbon which has a boiling point close to that of the olefin. Ideally, the solvent should have the same number of carbon atoms as the monomer, although this is not possible in the case of ethylene polymerization, since ethane has a critical temperature well below the temperature of polymerization. For ethylene and propylene the preferred solvent is propane, while for butene-1 polymerization the preferred solvent is butane or isobutane.

As the polymerization proceeds, the catalyst particles become coated with solid polymer until a point is reached at which the rate of diffusion of monomer to the catalyst surface has been slowed down to such an extent by the polymer that reaction ceases for all practical purposes. At this time, it is the practice to treat the reaction mixture with an oxygenated compound such as methanol or isopropyl alcohol in order to decompose the catalyst, which is pyrophoric and would present hazards in the later processing of the polymer in the presence of air unless it were so decomposed. Decomposition of the catalyst produces inactive metal compounds of undetermined composition which must be removed from the polymer, since they adversely affect its appearance and physical characteristics.

Heretofore it has been the practice to grind the polymer to a powder, dissolve the metal compounds in a solution of a mineral acid, wash the polymer free of acid, and then dry the polymer. This procedure requires expensive acid-resistant material of construction, the cost of the acid used adds to the expense of the process, and recovery of titanium values from the acid solution may cost more than the titanium is worth. In addition, the acid treatment, washing and drying must be carried out in separate pieces of equipment, which involves a not inconsiderable increase in investment over that which would be required if metal compound separation and drying could be carried out in one piece of equipment.

It is an object of this invention to provide a method for removal of metallic contaminants from solid polymers of normally gaseous olefins which eliminates the need for an acid treating step to remove catalyst residues from the polymer.

It is a further object of this invention to provide a process for simultaneously drying polymers and removing catalyst contaminants therefrom.

It is still another object of the invention to recover metallic catalyst residues in dry form thus enabling the easy recovery of metallic values therefrom.

In accordance with the present invention, the foregoing objects are attained by polymerizing a normally gaseous olefin in solution in a low boiling inert hydrocarbon solvent, and in the presence of a Ziegler polymerization catalyst, at temperatures of from 150° F. to 190° F., and recovering a slurry of solid polymer in solvent and unreacted monomer. The slurry is then passed to a comminutor, which may be any apparatus known to the art for reducing solid materials to finely divided form, in which the solid polymer is reduced to a size approximating the size of the catalyst particles, in the presence of a small amount of a catalyst deactivator such as methanol or isopropanol, in order to form a slurry of discrete particles of catalyst residues and polymer in solvent.

This slurry is then sprayed into a tower in which it is contacted with an upwardly flowing stream of recycle gases, which are heated to a temperature sufficiently high to insure evaporation of the liquid content of the slurry. The hot gases move upwardly in the tower at speed such as to carry the polymer particles upwardly, while allowing the heavier catalyst residues to drop to the bottom of the tower. Since the catalyst residues have a density of about 2.4, and the polymer particles, due to their porous structure, have an apparent density of the order of 0.2 to 0.4, it is apparent that the speed of the gases may be varied over a considerable range without allowing the polymer to settle or carrying the catalyst residues overhead with the polymer. The permissible speed will also vary with the degree of subdivision of the polymer and catalyst particles. However, knowing the size of the particles, any one skilled in the art may easily calculate the speed which will allow separation of polymer from catalyst.

Catalyst residues are removed from the bottom of the tower, for further processing to recover metallic values, while dry polymer, free from catalyst residues, is recovered from an upper section of the tower. Gases, which comprise solvent and unreacted olefin, are removed as an overhead from the tower, and are passed through a cyclone separator in which any polymer fines carried over with the gases are removed. The gases are then split into two streams, one of which is heated and returned to the tower to act as the drying and carrier gas therein, while the other is compressed to liquefy the gases, and the liquid is passed to a fractionator in which solvent and unreacted olefin is recovered overhead for recycle to the polymerization step, while catalyst deactivator is recovered as bottoms for recycle to the comminution step.

In order that those skilled in the art may more fully understand the nature of my invention and the manner of carrying it out, an example thereof will be more fully described in connection with the accompanying drawings, in which:

Fig. 1 is a diagrammatic flow sheet of a polymerization process according to the invention; and Fig. 2 is an elevational view, partly in cross-section, of a drying and separation tower adapted for use in the invention.

Referring now more particularly to Fig. 1, a recycle stream consisting of propylene dissolved in propane in a weight ratio of propane to propylene of 2:1, is introduced through line 1 to reactor 2, which advantageously may be a pulsating reactor of the type described in my co-pending application Serial No. 656,540, filed May 2, 1957, at the rate of 1800 pounds per hour. Fresh propylene feed is admitted to reactor 2 at spaced points along the length thereof through feed manifold 3 and feed lines 4 at the rate of 100 pounds per hour, while a catalyst prepared by reacting 0.6 mol of aluminum triethyl with one mol of titanium trichloride, is passed as a slurry in propane to reactor 2 through line 5 at the rate of 2 pounds per hour. The contents of reactor 2 are maintained under a pressure of 600 p.s.i.g. in order to maintain the reaction mixture in liquid phase at the reaction temperature, which is 190° F.

Nineteen hundred and two pounds per hour of reaction product, which comprises 100 pounds of solid polypropylene, 1200 pounds of propane, and 600 pounds of unreacted propylene, is taken from reactor 2 through line 6 and is passed to solid-liquid separator 7, from which 600 pounds of propane and 300 pounds of unreacted propylene per hour is removed through line 8, which connects with line 1, for recycle to reactor 2. A slurry comprising propane, unreacted propylene, solid polypropylene, and catalyst is removed from solids-liquid separator 7 at the rate of 1002 pounds per hour and is passed through line 9 to comminutor 10, in which the polymer and catalyst is ground to a size approximating 100 mesh in the presence of 0.5% by weight of the slurry of methanol, introduced into the comminutor through line 11.

From comminutor 10 the slurry, which now consists of discrete particles of polymer and catalyst residue suspended in propane and unreacted propylene, and which is still at 190° F., under a pressure of 600 p.s.i.g., is passed through line 12 to drying tower 13, the construction of which is more clearly shown in Fig. 2. As may be seen in Fig. 2, the tower 13 is in the shape of an inverted cone, and is provided about midway of its height with an inwardly and upwardly extending baffle 14 which extends about its periphery, and which forms a trough 15. Baffle 14 serves to divide tower 13 into a lower catalyst collection zone 16 and an upper polymer disengaging zone 17. The slurry from line 12 is introduced to tower 13, which is maintained at a pressure of 10 p.s.i.g., through nozzle 18, which projects a spray of slurry downwardly into the opening formed by baffle 14. At this pressure most of the propane and unreacted propylene will flash off and be removed through line 19. The polymer, catalyst residue, and whatever liquid is not flashed off is projected downwardly and is met by an upwardly flowing stream of propane and propylene which is introduced to tower 13 through line 20 and nozzle 21 at a temperature of 200° F. at the rate of 568 pounds per hour, the dimensions of baffle 14 being such that the linear velocity of the upflowing gas is about one foot per second. The upflowing gas, at this temperature, will evaporate the balance of the liquid portion of the slurry, and at this velocity, will carry polymer particles back up into polymer disengaging zone 17, while allowing the catalyst particles to fall into catalyst collection zone 16, from which they are removed via line 22. The bulk of the polymer particles are projected upwardly and outwardly against the wall of polymer disengaging zone 17, and will settle into trough 15, from which they are removed via line 23 as a product essentially free of catalyst contaminants.

The off-gases removed from tower 13 through line 19, which comprise 980 pounds of propane and 488 pounds of propylene per hour, together with a small amount of polymer fines, are taken to cyclone separator 24, from which the fines are recovered through line 25. The solid-free gases are recovered through line 26 and are split into two streams, one of which, comprising 350 pounds of propane and 188 pounds of propylene per hour, is taken through line 27 and heater 28, in which it is heated to 200° F., and is reintroduced to tower 13 via line 20. The other stream, comprising 600 pounds of propane and 300 pounds of propylene per hour, is passed through compressor 29 and condenser 30, in which it is liquefied, to fractionating tower 31, from which a stream consisting of propane and propylene is recovered overhead through line 32 for recycle to reactor 2, and a bottoms comprising methanol is recovered through line 33. If additional propane is required to make up for processing losses, it may be added to the system through line 34, which connects with recycle line 1.

While, as stated above, it is preferred that, when possible, the solvent have the same number of carbon atoms as the olefin to be polymerized, the invention is not so limited, since any low boiling hydrocarbon such as pentane may be used. Use of a solvent having more carbon atoms than the olefin to be polymerized has the advantage that lower pressures may be used in reactor 2, but the heat load required in dryer 13 will be greatly increased, requiring that the size thereof be increased to permit passage of greater quantities of hot recycle gas thereto through line 20 while still keeping the velocity of the upwardly flowing gases sufficiently low to enable the catalyst particles to drop.

In the foregoing example, the polymer slurry was held at reaction temperature until it was introduced to the drying tower, in order to hold to a minimum the amount of gases required to be passed to the tower through line 20. However, in some cases it may be advantageous to cool the slurry to below the brittle point of the polymer contained therein in order to facilitate the grinding operation. In such a case the slurry may be reheated after grinding, or the quantity of gas introduced through line 20 may be increased to provide sufficient heat for the evaporation of the liquid component of the slurry.

It also falls within the scope of the invention to conduct the drying operation in a tower of sufficiently small cross-section throughout to allow all of the polymer to be carried overhead with the carrier gas to the cyclone. In such a case, baffle 14 in tower 13 would be omitted.

The invention claimed is:

1. An olefin polymerization process which comprises contacting a normally gaseous 1-olefin dissolved in a low boiling paraffin solvent with a polymerization catalyst selected from the group consisting of complexes formed by the reaction of a halide of a metal of groups IV, V, and VI with a metal alkyl selected from the group consisting of alkyl derivatives of aluminum, zinc, beryllium, chromium, magnesium, sodium, potassium and lithium at a temperature of from 150° F. to 250° F., at a pressure sufficient to maintain the olefin and solvent in liquid phase, recovering a reaction product comprising polymer carrying occluded catalyst particles, separating a slurry of polymer particles in solvent and unreacted olefin, comminuting the polymer particles in the presence of a catalyst deactivator to form a slurry comprising discrete particles of polymer and deactivated catalyst, passing the slurry to a drying tower, contacting it therein with an upwardly flowing stream of heated gases in a quantity sufficient to evaporate the liquid component of the slurry, the velocity of the gases being sufficiently high to carry the polymer particles upwardly, but sufficiently low to allow the deactivated catalyst particles to settle, recovering deactivated catalyst particles from the bottom of the drying tower, recovering polymer particles essentially free of deactivated catalyst from the upwardly flowing gases, separating the upwardly flowing gases into two portions, heating one of the portions, returning the heated portion of the gases to the drying tower, and utilizing it therein as the aforementioned upwardly flowing stream of heated gases.

2. The process according to claim 1 in which the olefin is ethylene and the solvent is propane.

3. The process according to claim 1 in which the olefin is propylene and the solvent is propane.

4. The process according to claim 1 in which the olefin is butene-1 and the solvent is selected from the group consisting of butane and isobutane.

References Cited in the file of this patent

UNITED STATES PATENTS

| | | |
|---|---|---|
| 2,683,685 | Matheson | July 13, 1954 |
| 2,704,154 | Huth | Mar. 15, 1955 |

FOREIGN PATENTS

| | | |
|---|---|---|
| 534,792 | Belgium | Jan. 31, 1955 |
| 538,782 | Belgium | Dec. 6, 1955 |